(12) United States Patent
Lin

(10) Patent No.: US 11,518,254 B1
(45) Date of Patent: Dec. 6, 2022

(54) POWER ADJUSTMENT SYSTEM AND POWER ADJUSTMENT METHOD OF AUTONOMOUS MOBILE DEVICE

(71) Applicant: ADATA TECHNOLOGY CO., LTD., New Taipei (TW)

(72) Inventor: Chi-Chien Lin, Keelung (TW)

(73) Assignee: ADATA TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/535,757

(22) Filed: Nov. 26, 2021

(30) Foreign Application Priority Data

Sep. 10, 2021 (TW) .................................. 110133667

(51) Int. Cl.
| | |
|---|---|
| *B60L 15/20* | (2006.01) |
| *G01C 9/08* | (2006.01) |
| *B60W 40/10* | (2012.01) |
| *B60R 16/023* | (2006.01) |
| *B62D 11/02* | (2006.01) |
| *B62D 11/04* | (2006.01) |

(52) U.S. Cl.
CPC ...... *B60L 15/2036* (2013.01); *B60R 16/0233* (2013.01); *B60W 40/10* (2013.01); *B62D 11/02* (2013.01); *B62D 11/04* (2013.01); *G01C 9/08* (2013.01)

(58) Field of Classification Search
None
See application file for complete search history.

(56) References Cited

U.S. PATENT DOCUMENTS

| | | | |
|---|---|---|---|
| 7,082,350 B2 * | 7/2006 | Skoog | G05D 1/0891 180/441 |
| 9,026,299 B2 | 5/2015 | Johnson et al. | |
| 9,072,218 B2 | 7/2015 | Johnson et al. | |
| 11,007,635 B2 | 5/2021 | Georgeson et al. | |
| 2019/0250615 A1 * | 8/2019 | Gillett | A63C 17/012 |
| 2020/0130703 A1 | 4/2020 | Pendelton et al. | |

(Continued)

FOREIGN PATENT DOCUMENTS

| | | |
|---|---|---|
| CN | 103543746 A | 1/2014 |
| CN | 104317289 A | 1/2015 |

(Continued)

*Primary Examiner* — Kevin R Steckbauer
(74) *Attorney, Agent, or Firm* — Li & Cai Intellectual Property (USA) Office

(57) ABSTRACT

A power adjustment system and a power adjustment method of an autonomous mobile device are provided. In the power adjustment method, two first current control signals respectively transmitted to two drivers are outputted by a control module. A tilt angle of the autonomous mobile device is detected by an inertial measurement module. A travel route is planned by a navigation module, and the control module obtains a steering angle of the autonomous mobile device during a traveling process. According to different weight values of the autonomous mobile device stored in a database module, a weight of the autonomous mobile device is estimated by the control module. According to the two first current control signals and the weight, the steering angle, and the tilt angle of the autonomous mobile device, two second current control signals respectively transmitted to the two drivers are outputted by the control module.

12 Claims, 8 Drawing Sheets

(56) References Cited

U.S. PATENT DOCUMENTS

| | | |
|---|---|---|
| 2020/0298415 A1 | 9/2020 | Sun et al. |
| 2021/0397200 A1* | 12/2021 | Aschpurwis ........ B60W 40/076 |

FOREIGN PATENT DOCUMENTS

| | | | | |
|---|---|---|---|---|
| CN | 106276009 A | | 1/2017 | |
| CN | 106276009 A | * | 1/2017 | ............. B25J 11/00 |
| CN | 207676208 U | * | 7/2018 | ........... G05D 1/0223 |
| CN | 108859862 A | * | 11/2018 | ............. B60L 15/20 |
| CN | 109521767 A | | 3/2019 | |
| CN | 109521767 A | * | 3/2019 | ........... G05D 1/0217 |
| CN | 103542800 B | | 6/2019 | |
| CN | 109848992 A | * | 6/2019 | |
| CN | 109848992 A | | 6/2019 | |
| CN | 110775177 A | | 2/2020 | |
| CN | 109080627 B | * | 5/2020 | ........... B60W 30/04 |
| CN | 109204317 B | * | 5/2020 | ........... B60W 40/10 |
| CN | 111186402 A | | 5/2020 | |
| CN | 211942987 U | | 11/2020 | |
| CN | 211942987 U | * | 11/2020 | |
| CN | 112752699 A | * | 5/2021 | ........... B60W 10/20 |
| CN | 112752699 A | | 5/2021 | |
| CN | 113173157 A | * | 7/2021 | |
| CN | 113199454 A | * | 8/2021 | ........... B62D 55/065 |
| CN | 214112715 U | * | 9/2021 | ........... B62D 55/065 |
| CN | 113619564 A | * | 11/2021 | |
| CN | 113619591 A | * | 11/2021 | |
| CN | 113715634 A | * | 11/2021 | ........... B60W 10/08 |
| CN | 113619591 B | * | 12/2021 | |
| CN | 113788025 A | * | 12/2021 | ........... B60W 30/04 |
| CN | 114179806 A | * | 3/2022 | ........... B62D 55/065 |
| CN | 112406853 B | * | 5/2022 | ........... B60W 30/02 |
| DE | 102017201796 A1 | * | 8/2018 | ........... B60W 40/10 |
| DE | 102021112774 A1 | * | 12/2021 | ........... B60W 30/04 |
| DE | 102020121733 A1 | * | 2/2022 | ........... B60W 30/04 |
| EP | 3628569 A1 | * | 4/2020 | ........... B60W 10/20 |
| JP | 2017063535 A | * | 3/2017 | ........... B62D 55/065 |
| TW | 202116246 A | | 5/2021 | |
| WO | WO-2004045942 A1 | * | 6/2004 | ............... B62H 1/12 |
| WO | WO 2021045998 A1 | | 3/2021 | |
| WO | WO-2022037874 A1 | * | 2/2022 | |

\* cited by examiner

| | vehicle weight [300kg] | vehicle weight [500kg] | vehicle weight [700kg] |
|---|---|---|---|
| vehicle speed [KPH] when tilt angle θ1 is 0 degrees | 18.8 | 11.3 | 8.0 |
| vehicle speed [KPH] when tilt angle θ1 is 5 degrees | 17.3 | 9.7 | 6.4 |
| vehicle speed [KPH] when tilt angle θ1 is 10 degrees | 15.8 | 8.1 | 4.8 |
| vehicle speed [KPH] when tilt angle θ1 is 15 degrees | 14.3 | 6.6 | 3.8 |

FIG. 7

POWER ADJUSTMENT SYSTEM AND POWER ADJUSTMENT METHOD OF AUTONOMOUS MOBILE DEVICE

CROSS-REFERENCE TO RELATED PATENT APPLICATION

This application claims the benefit of priority to Taiwan Patent Application No. 110133667, filed on Sep. 10, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power adjustment system and a power adjustment method applicable for an autonomous mobile device, and more particularly to a power adjustment system and a power adjustment method that enhances a steering stability of the autonomous mobile device.

BACKGROUND OF THE DISCLOSURE

In the conventional technology, an autonomous mobile device (such as an autonomous mobile robot (AMR) or an automated guide vehicle (AGV)) generally cannot determine an accurate steering angle when traveling and steering, such that a motor driving system inside the autonomous mobile device cannot output appropriate power to wheels and shafts located at two sides thereof. As a result, the motor driving system can easily generate excessive power and cause the autonomous mobile device to have poor stability when making a turn.

Therefore, increasing a work efficiency of the autonomous mobile device and decreasing power consumption through an improvement in the stability of the autonomous mobile device when making a turn, so as to overcome the above-mentioned problems, has become one of the important issues to be addressed in the related art.

SUMMARY OF THE DISCLOSURE

In response to the above-referenced technical inadequacies, the present disclosure provides a power adjustment system and a power adjustment method of an autonomous mobile device.

In one aspect, the present disclosure provides a power adjustment system of an autonomous mobile device, which includes two driving modules, an inertial measurement module, a navigation module, a database module, and a control module. The two driving modules are disposed in the autonomous mobile device, and are respectively connected to two wheels of the autonomous mobile device. The two driving modules operate independently from each other. Each of the driving modules includes one of two drivers and one of two motors electrically connected thereto, and each of the motors is connected to a corresponding one of the wheels. The inertial measurement module is disposed in the autonomous mobile device, and is configured to detect a tilt angle of the autonomous mobile device. The navigation module is configured to plan a travel route, such that the autonomous mobile device travels along the travel route. The database module is configured to store different weight values of the autonomous mobile device. The control module is disposed in the autonomous mobile device, and the control module is electrically connected to the two driving modules, the inertial measurement module, the navigation module, and the database module. When the autonomous mobile device moves along the travel route, the control module obtains a steering angle of the autonomous mobile device during a traveling process. The control module is configured to output two first current control signals that are respectively transmitted to the two drivers, such that the two drivers output two initial currents respectively to the two motors, and the two motors respectively drive the two wheels to move the autonomous mobile device. The control module is configured to estimate a weight of the autonomous mobile device according to information in the database module. The control module is configured to output two second current control signals that are respectively transmitted to the two drivers according to the two first current control signals and the weight, the steering angle, and the tilt angle of the autonomous mobile device, and the two drivers output two adjusting currents respectively to the two motors according to the two second current control signals, such that the two motors respectively drive the two wheels to perform a differential control.

In another aspect, the present disclosure provides a power adjustment method of an autonomous mobile device. The autonomous mobile device is arranged to include two driving modules, an inertial measurement module, a navigation module, a database module, and a control module. The two driving modules are respectively connected to two wheels of the autonomous mobile device. Each of the driving modules includes one of two drivers and one of two motors electrically connected thereto, and each of the motors is connected to a corresponding one of the wheels. The control module is electrically connected to the two driving modules, the inertial measurement module, the navigation module, and the database module. The power adjustment method includes: outputting two first current control signals that are respectively transmitted to the two drivers by the control module, such that the two drivers output two initial currents respectively to the two motors, and the two motors respectively drive the two wheels to move the autonomous mobile device; detecting a tilt angle of the autonomous mobile device by the inertial measurement module; planning a travel route by the navigation module, such that the autonomous mobile device travels along the travel route, and the control module obtains a steering angle of the autonomous mobile device during a traveling process; estimating, according to different weight values of the autonomous mobile device stored in the database module, a weight of the autonomous mobile device by the control module; and outputting, according to the two first current control signals and the weight, the steering angle, and the tilt angle of the autonomous mobile device, two second current control signals that are respectively transmitted to the two drivers by the control module, in which the two drivers output two adjusting currents respectively to the two motors according to the two second current control signals, such that the two motors respectively drive the two wheels to perform a differential control.

Therefore, in the power adjustment system and the power adjustment method of the autonomous mobile device provided by the present disclosure, by virtue of "the control module being configured to output two first current control signals that are respectively transmitted to the two drivers, such that the two drivers output two initial currents respectively to the two motors, and the two motors respectively drive the two wheels to move the autonomous mobile device, and the control module being configured to estimate a weight of the autonomous mobile device according to information in the database module" and "the control module being configured to output two second current control signals that are respectively transmitted to the two drivers according to the two first current control signals and the weight, the steering angle, and the tilt angle of the autonomous mobile device, and the two drivers outputting two adjusting currents respectively to the two motors according to the two second current control signals, such that the two motors respectively drive the two wheels to perform a differential control," stability of the autonomous mobile device when making a turn can be improved, work efficiency of the autonomous mobile device can be increased, and power consumption can be decreased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 7 is a vehicle weight estimate table of the power adjustment system of the autonomous mobile device according to the present disclosure.

DETAILED DESCRIPTION OF THE EXEMPLARY EMBODIMENTS

Figure 1:
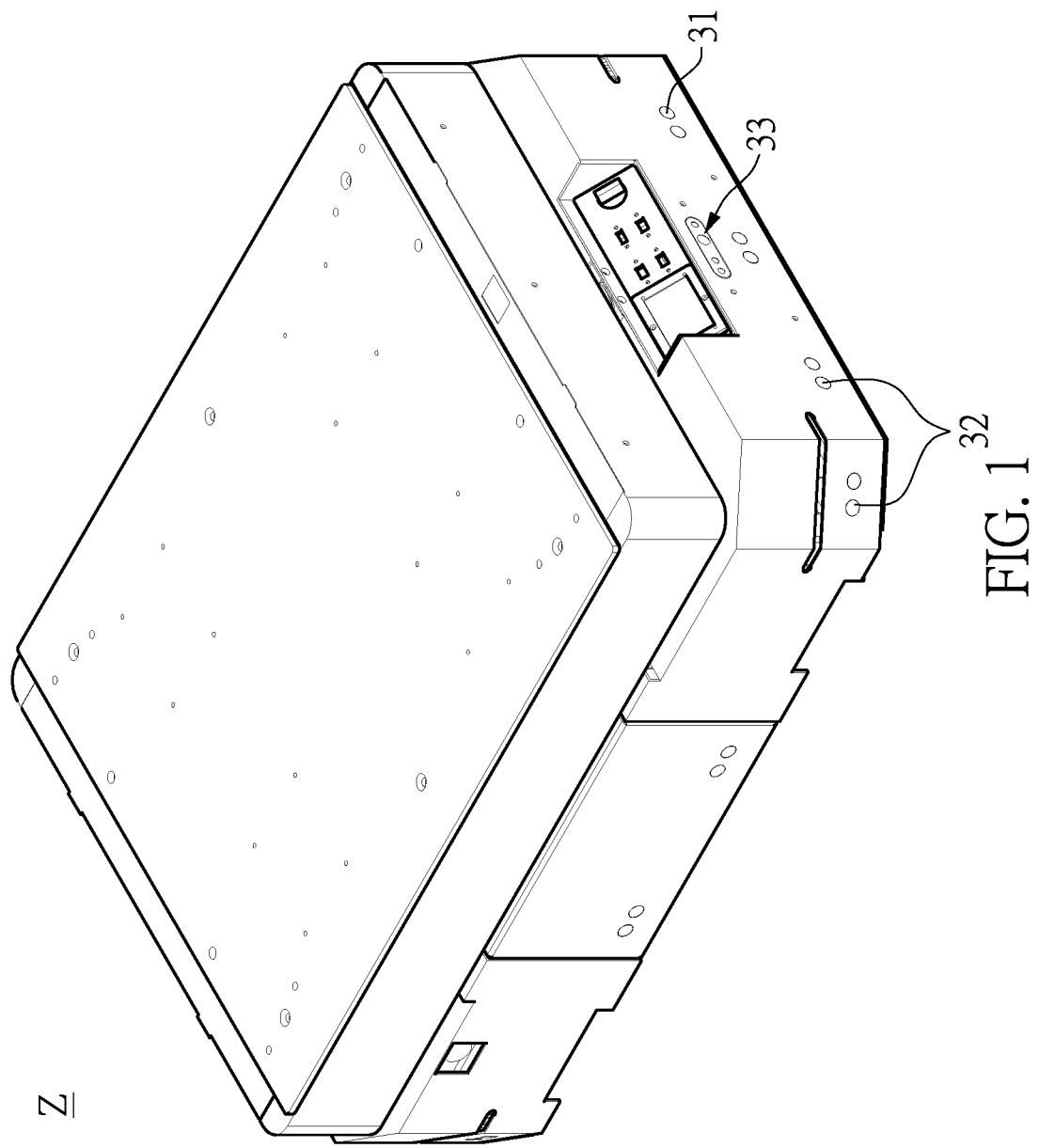
FIG. 1 is a schematic perspective view of an autonomous mobile device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

EMBODIMENT

Figure 2:
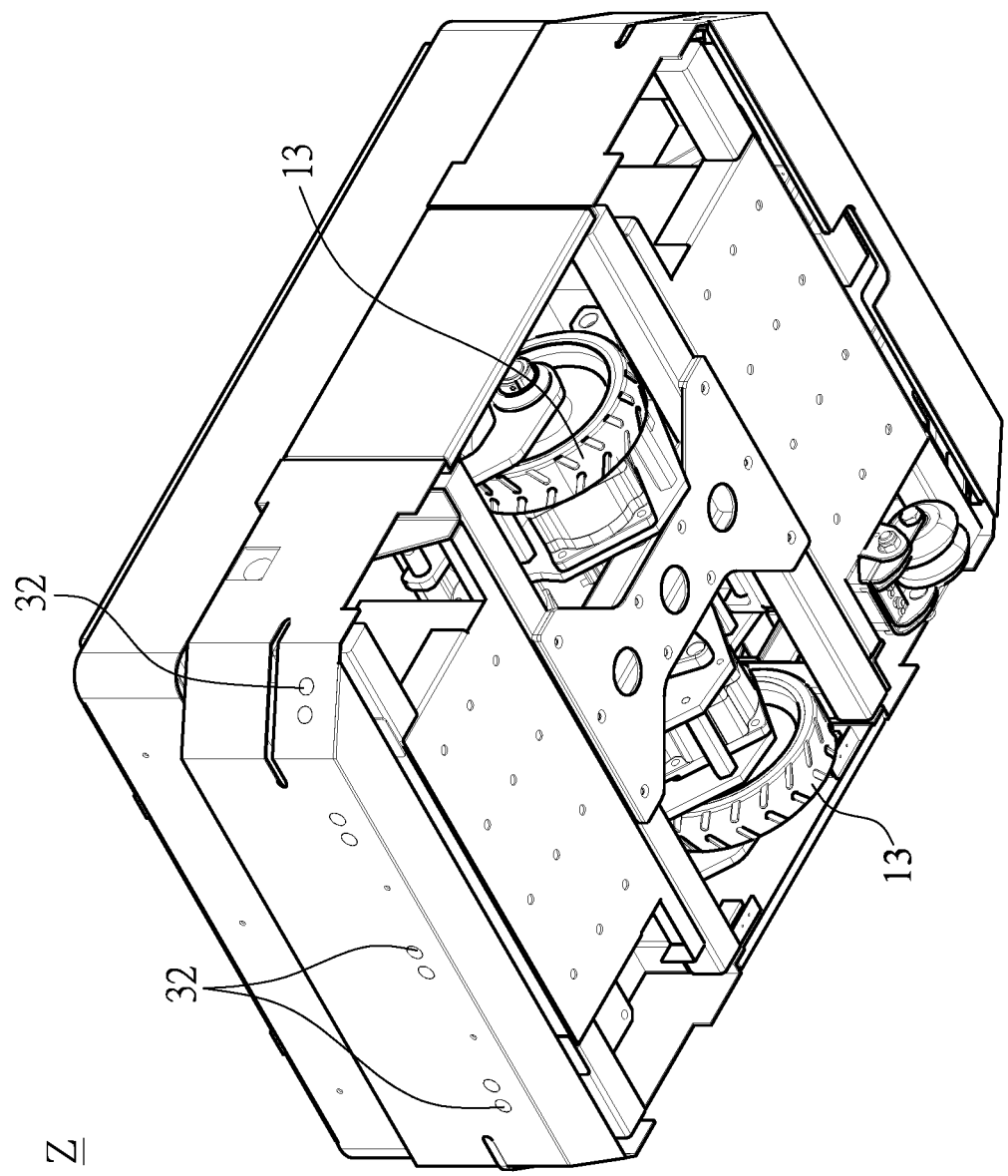
FIG. 2 is another schematic perspective view of the autonomous mobile device according to the present disclosure.
Figure 3:
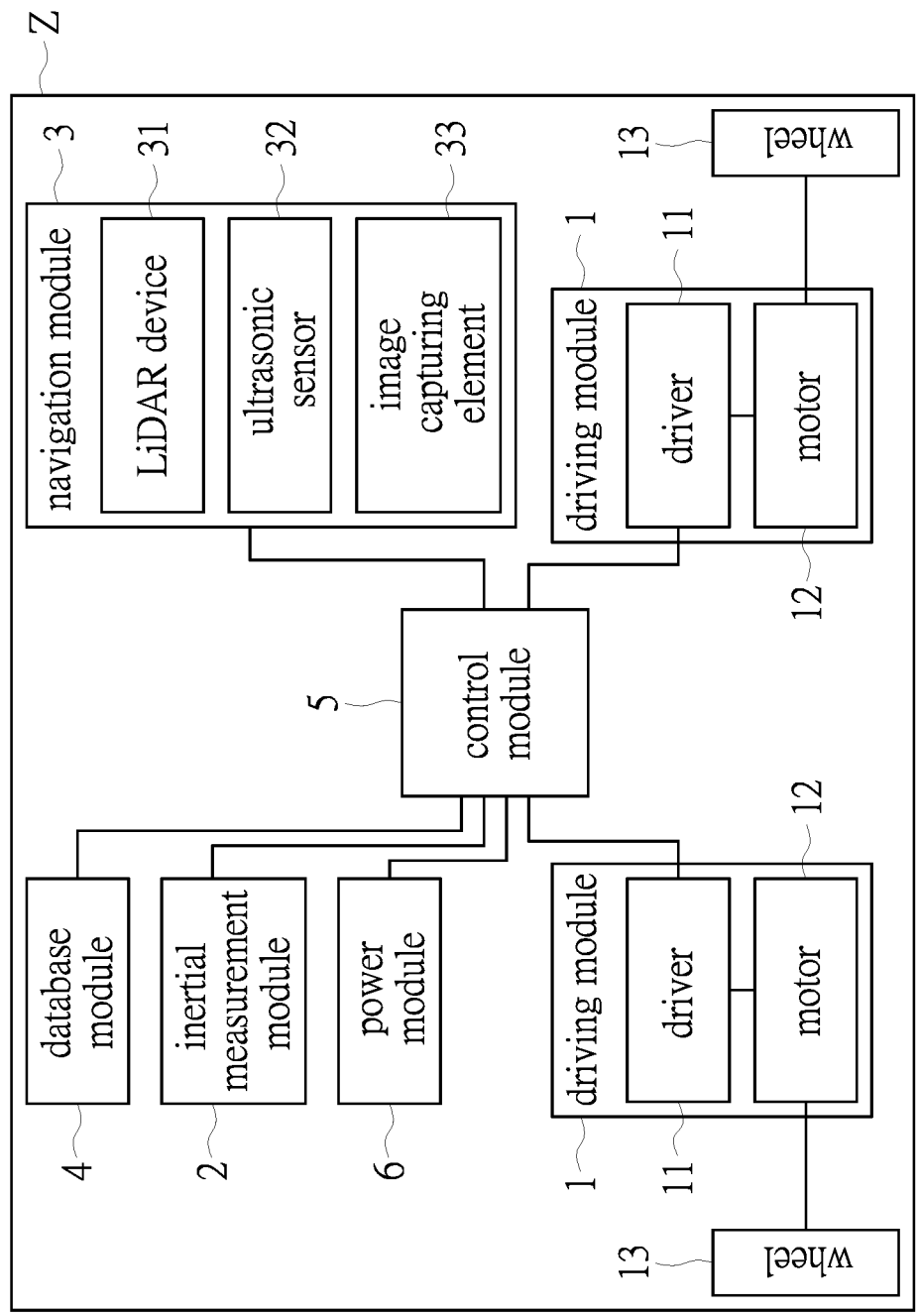
FIG. 3 is a schematic system diagram of a power adjustment system of the autonomous mobile device according to the present disclosure.

Reference is made to FIG. 1, FIG. 2 and FIG. 3, in which FIG. 1 and FIG. 2 are schematic perspective views of an autonomous mobile device according to the present disclosure, and FIG. 3 is a schematic system diagram of a power adjustment system of the autonomous mobile device according to the present disclosure. An embodiment of the present disclosure provides an autonomous mobile device Z. The autonomous mobile device Z can be, for example, an autonomous mobile robot (AMR) or an automated guided vehicle (AGV). The autonomous mobile device Z includes two driving modules 1, an inertial measurement module 2, a navigation module 3, a database module 4, and a control module 5. The two driving modules 1, the inertial measurement module 2, the database module 4, and the control module 5 are disposed in the autonomous mobile device Z, and the navigation module 3 is disposed on the autonomous mobile device Z. The control module 5 is electrically connected to the two driving modules 1, the inertial measurement module 2, the navigation module 3, and the database module 4. The two driving modules 1 are respectively connected to two wheels 13 of the autonomous mobile device Z. The two wheels 13 of the autonomous mobile device Z are arranged at a bottom portion of the autonomous mobile device Z. In the present embodiment, the two driving modules 1 operate independently from each other. Each of the driving modules 1 includes one of two drivers 11 and one of two motors 12 electrically connected thereto. Each of the motors 12 is connected to a corresponding one of the wheels 13. Specifically, the driver 11 of the driving module 1 can be connected to a power module 6, and the control module 5 can be electrically connected between the driver 11 and the power module 6. Electric power provided by the power module 6 is transmitted to the motor 12 through the driver 11. The driver 11 can convert a constant voltage of an alternating current supply provided by the power module 6 into a variable voltage that is capable of controlling a torque and a rotational speed of the motor 12.

Figure 4:
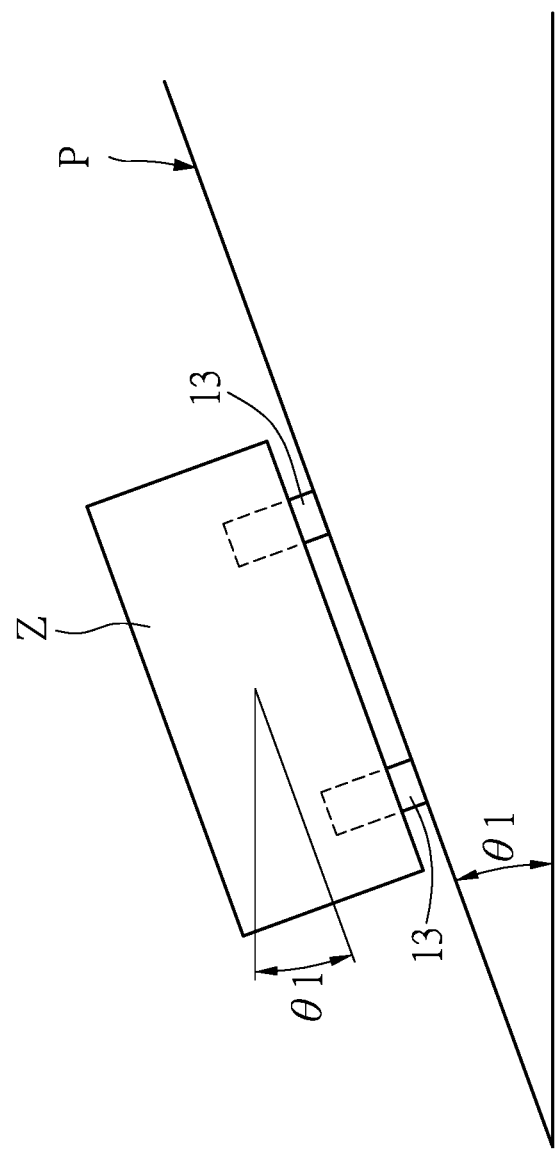
FIG. 4 is a schematic view showing the autonomous mobile device being tilted according to the present disclosure.

Referring to FIG. 4, FIG. 4 is a schematic view showing the autonomous mobile device being tilted according to the present disclosure. For example, the inertial measurement module 2 can include a plurality of acceleration sensing elements (which mainly measure a linear acceleration of a movement direction of the autonomous mobile device) and a plurality of gyroscopes (which mainly measure an angular velocity of the movement direction of the autonomous mobile device). Accordingly, a relevant state that the autonomous mobile device Z is in can further be computed, so as to obtain a tilt angle $\theta_1$ of the autonomous mobile device Z. If the autonomous mobile device Z is located on a slope surface P, the inertial measurement module 2 can measure that the autonomous mobile device Z is in a tilted state (that is, a vehicle body of the autonomous mobile device Z is at the tilt angle $\theta_1$ relative to a horizontal plane). As such, the inertial measurement module 2 can detect the tilt angle $\theta_1$ of the autonomous mobile device Z, and the tilt angle $\theta_1$ is equivalent to a slope angle of the slope surface P (i.e., a gradient of the slope surface P). In addition, the autonomous mobile device Z further includes a speed sensing element (not shown in the drawings). The speed sensing element can be, for example, a shaft rotation speed sensor of magnetic induction type. The speed sensing element is coupled to the motor 12, so as to be connected to an output shaft (not shown in the drawings) of the wheel 13 and to detect a rotational speed of the output shaft. The control module 5 receives a sensing signal outputted from the speed sensing element, and obtains a speed of the autonomous mobile device Z by inference.

Figure 5:
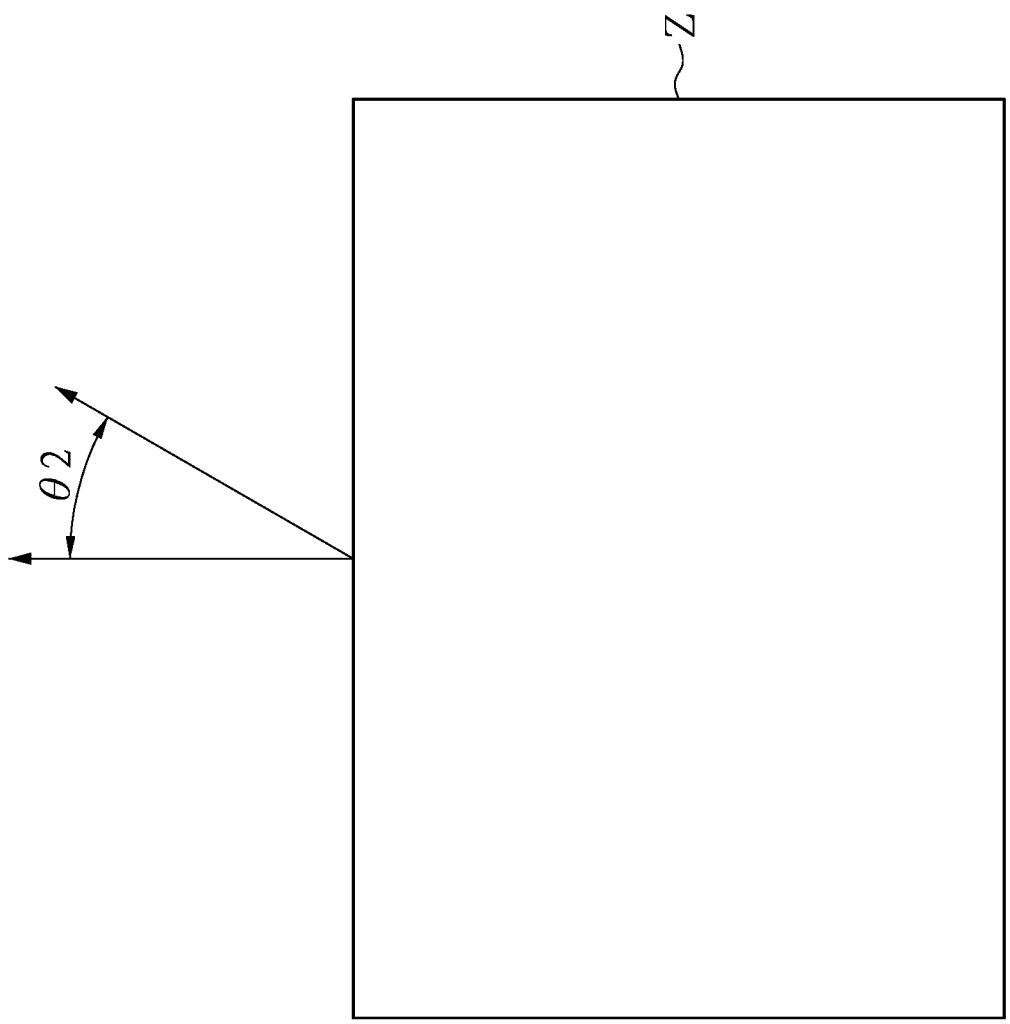
FIG. 5 is a schematic view showing the autonomous mobile device making a turn according to the present disclosure.

Referring to FIG. 3 and FIG. 5, FIG. 5 is a schematic view showing the autonomous mobile device making a turn according to the present disclosure. The navigation module 3 includes a light detection and ranging (LiDAR) device 31, an ultrasonic sensor 32, or an image capturing element 33. For example, the autonomous mobile device Z can perform a light-reflection navigation positioning via the LiDAR device 31; the autonomous mobile device Z can perform an ultrasonic navigation positioning via the ultrasonic sensor 32; or the autonomous mobile device Z can perform a visual-based navigation positioning via the image capturing element 33 (including, but not limited to, a camera or a charge-coupled device (CCD) image sensor). Specifically, in the embodiment of the present disclosure, the navigation module 3 can locate a position of the autonomous mobile device Z in real time, and can construct a map of a surrounding environment at the position of the autonomous mobile device Z. Accordingly, a travel route can be planned, which allows the autonomous mobile device Z to drive according to the travel route. Moreover, when the autonomous mobile device Z travels along the travel route, the control module 5 can obtain a steering angle $\theta_2$ of the autonomous mobile device Z during a traveling process.

The control module 5 is a vehicle control unit (VCU), and is arranged at an inside of the autonomous mobile device Z, so as to receive various sensing signals outputted from various sensing elements that are also arranged at the inside of the autonomous mobile device Z. For example, the control module 5 is electrically connected to the two driving modules 1, the inertial measurement module 2, the navigation module 3, and the database module 4 for signal transmission with the driving modules 1, the inertial measurement module 2, and the navigation module 3. In this way, the control module 5 can collect, read, and then analyze information such as current change amounts, tilt angles, and steering angles, so as to output corresponding control signals to relevant elements and order these elements to perform corresponding actions.

Figure 6:
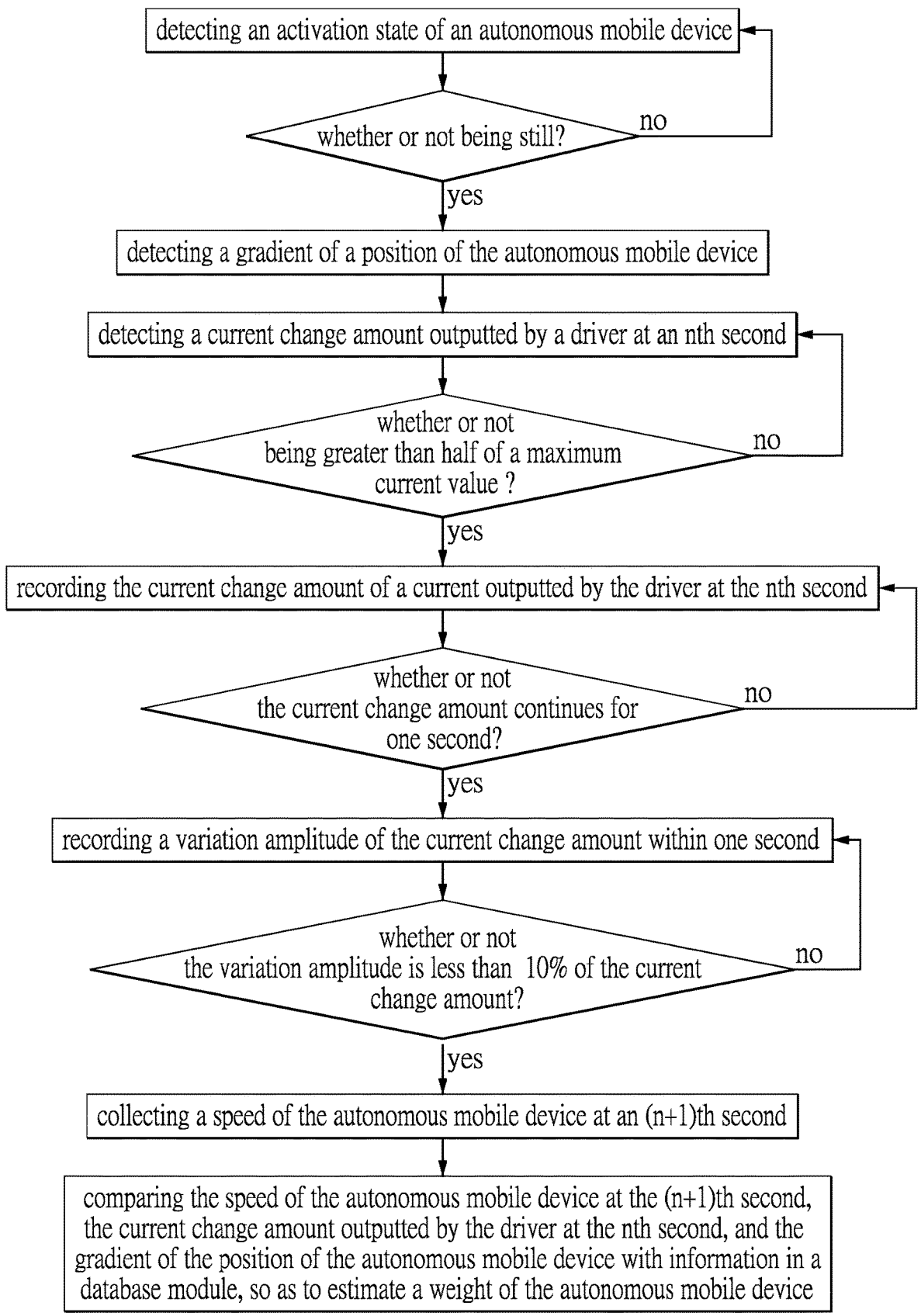
FIG. 6 is a schematic diagram showing a weight estimation process of the power adjustment system of the autonomous mobile device according to the present disclosure.

Referring to FIG. 6, FIG. 6 is a schematic diagram showing a weight estimation process of the power adjustment system of the autonomous mobile device according to the present disclosure. In the following description, a weight estimation mechanism of the power adjustment system of the autonomous mobile device in the present disclosure will be further illustrated. Firstly, the control module 5 can detect a current value that is outputted by the power module 6 and then transmitted to the motor 12 through the driver 11, so as to detect whether an activation state of the autonomous mobile device Z is set in a still state. Then, the inertial measurement module 2 detects a gradient of the position of the autonomous mobile device Z to obtain one tilt angle $\theta_1$, and the control module 5 collects and stores the tilt angle $\theta_1$ in the database module 4. The control module 5 further detects a current change amount outputted by each of the drivers 11 at an nth second. When the current change amount outputted by each of the drivers 11 at the nth second is greater than half of a maximum current value that can be outputted by each of the drivers 11, the control module 5 collects the current value at the nth second. When the current change amount outputted by each of the drivers 11 continues for k seconds (k=1 in the present embodiment), and a variation amplitude within the k seconds is less than 10% of the current change amount at the nth second, the control module 5 is configured to collect the speed of the autonomous mobile device Z at an (n+k)th second. In addition, the control module 5 is configured to compare the speed of the autonomous mobile device Z at the (n+k)th second, the current change amount outputted by the driver 11 at the nth second, and the gradient of the position of the autonomous mobile device Z with information in the database module 4, so as to estimate a weight of the autonomous mobile device Z.

It is worth mentioning that the database module 4 can be a storage device arranged inside the autonomous mobile device Z, such as a hard drive or memory. However, the present disclosure is not limited thereto. The database module 4 can also be a remote server, and performs signal transmission with the autonomous mobile device Z through internet connection. In the present embodiment, the database module 4 stores different weight values of the autonomous mobile device Z. It should be noted that the so-called weight of the autonomous mobile device Z includes a net weight of the autonomous mobile device Z and a loading weight. Apart from storing the different weight values of the autonomous mobile device Z, the database module 4 further includes the gradient of the position of the autonomous mobile device Z, the current change amount outputted by the driver 11, and the speed of the autonomous mobile device Z. To be more specific, the information stored in the database module 4 forms a database, which mainly includes a mapping table for various parameters obtained from multiple field tests. The mapping table shows different weights of the autonomous mobile device Z in response to the gradients (i.e., the tilt angles) of the autonomous mobile device Z at different positions, the current change amounts outputted by the driver 11 at different times, and different speeds of the autonomous mobile device Z. In other words, the database is an aggregate of relevant information (the gradient of the position of the autonomous mobile device Z, the current change amount outputted by the driver 11 at the different time, the different speed of the autonomous mobile device Z, and the weight of the autonomous mobile device Z), so that the control module 5 can obtain required results by way of searching, sequencing, calculating, enquiring, etc.

Reference is made to FIG. 7. FIG. 7 is a vehicle weight estimate table of the power adjustment system of the autonomous mobile device according to the present disclosure, in which one configuration of the mapping table stored in the database module 4 is illustrated. In a case where the current change amount outputted by the driver 11 is 100% and continues for one second (k=1), speed information corresponding to the different weights of the autonomous mobile device Z (a vehicle weight being 300 kg, 500 kg, and 700 kg) at different gradients (the tilt angle $\theta_1$ being 0 degrees, 5 degrees, 10 degrees, and 15 degrees) is shown. For example, when the tilt angle $\theta_1$ is 0 degrees, and the current change amount outputted by the driver 11 is 100% and continues for one second (k=1), a vehicle speed measured by the control module 5 is 5.23 m/s, which is 18.8 KPH (km/hr). From the vehicle weight estimate table, it can be observed that an estimated vehicle weight is 300 kg.

Figure 8:
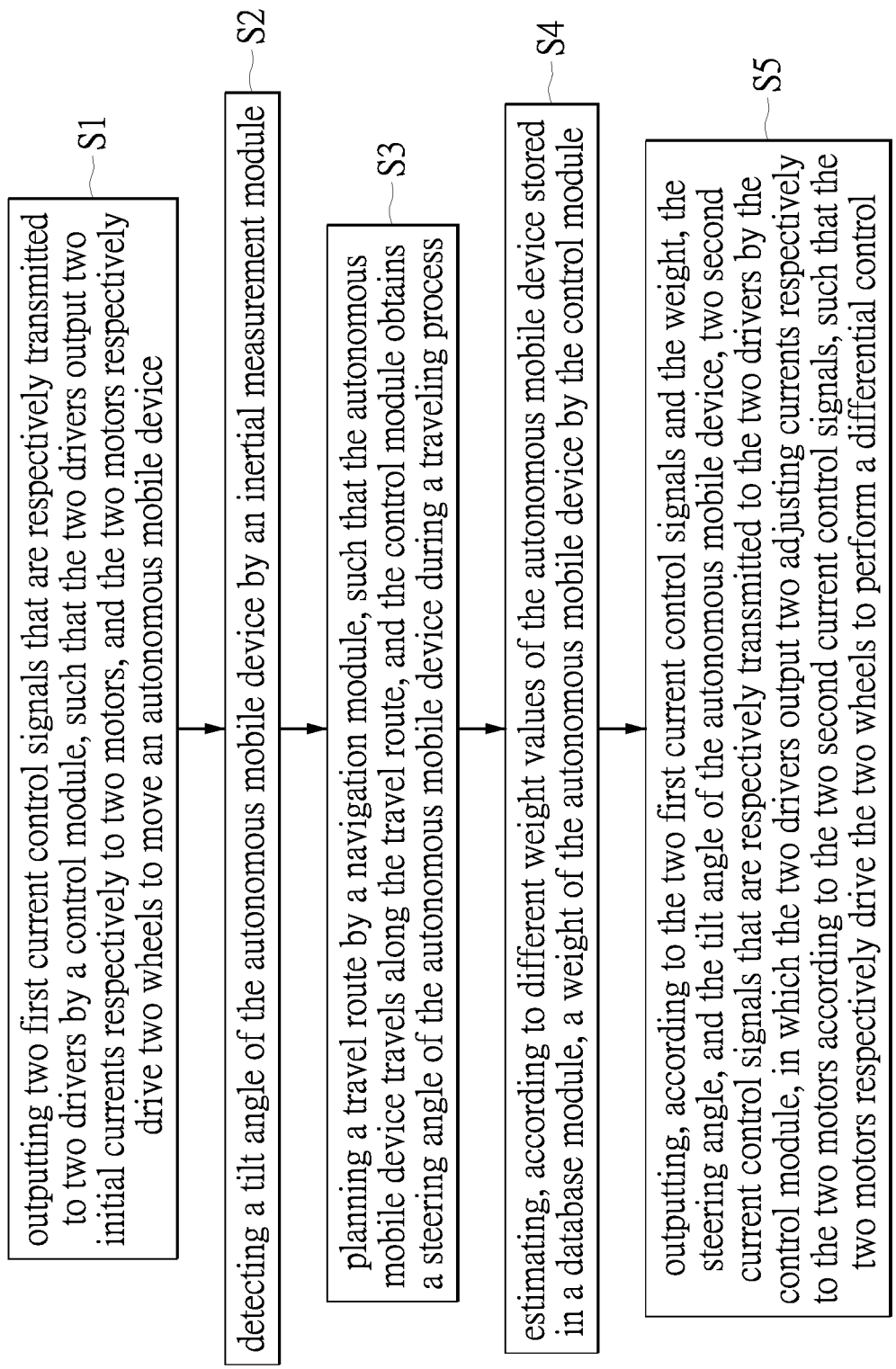
FIG. 8 is a schematic diagram showing step S1 to step S5 from a power adjustment method of the autonomous mobile device according to the present disclosure.

Referring to FIG. 8, FIG. 8 is a schematic diagram showing step S1 to step S5 from a power adjustment method of the autonomous mobile device according to the present disclosure. The power adjustment method of the autonomous mobile device provided in the present disclosure can be implemented by the above-mentioned power adjustment system of the autonomous mobile device Z. The power adjustment method includes at least the following steps:

Step S1: outputting two first current control signals that are respectively transmitted to the two drivers 11 by the control module 5, such that the two drivers 11 output two initial currents respectively to the two motors 12, and the two motors 12 respectively drive the two wheels 13 to move the autonomous mobile device Z;

Step S2: detecting the tilt angle $\theta_1$ of the autonomous mobile device Z by the inertial measurement module 2;

Step S3: planning the travel route by the navigation module 3, such that the autonomous mobile device Z travels along the travel route, and the control module 5 obtains the steering angle $\theta_2$ of the autonomous mobile device Z during the traveling process;

Step S4: estimating, according to the different weight values of the autonomous mobile device Z stored in the database module 4, the weight of the autonomous mobile device Z by the control module 5; and Step S5: outputting, according to the two first current control signals and the weight, the steering angle $\theta_2$, and the tilt angle $\theta_1$ of the autonomous mobile device Z, two second current control signals that are respectively transmitted to the two drivers 11 by the control module 5, in which the two drivers 11 output two adjusting currents respectively to the two motors 12 according to the two second current control signals, such that the two motors 12 respectively drive the two wheels 13 to perform a differential control.

In continuation of the above, the control module 5 adjusts the first current control signal according to a signal gain function, and then outputs the second current control signal. The signal gain function is as follows:

$$L2=L1\times(W/W_0)\times(1\pm\tan(\theta_1))\times(1\pm\tan(\theta_2)).$$

Here, L1 is the first current control signal, L2 is the second current control signal, W is the weight of the autonomous mobile device Z, $W_0$ is a predetermined reference weight of the autonomous mobile device Z ($W_0$=500 kg in the present embodiment), ($W/W_0$) is a weight factor, $\theta_1$ is the tilt angle while ($1\pm\tan(\theta_1)$) is a gradient factor, and $\theta_2$ is the steering angle while ($1\pm\tan(\theta_2)$) is a steering factor.

It should be noted that since the two driving modules 1 in the present disclosure operate independently from each other, gain values obtained by the two driving modules 1 during steering are not the same. In the following description, two examples are provided for further illustration of the above-mentioned differential control.

For example, when the autonomous mobile device Z with a weight of 300 kg turns left by 10 degrees (the steering angle $\theta_2$ being 10 degrees) on a right-inclined slope having a gradient of 10 degrees (the tilt angle $\theta_1$ being 10 degrees), the weight factor of the driving module 1 on the left is (300/500)=0.6. The gradient factor is (1+tan(10))=1.176 (since the motor 12 needs to output greater torque when turning left on the right-inclined slope, the gradient factor is increased), and the steering factor is (1−tan(10))=0.823 (since the motor 12 of the driving module 1 on the left needs to output lesser torque when turning left, the steering factor is decreased). Therefore, an overall gain of the driving module 1 on the left is 0.6×1.176×0.823=0.58. That is to say, with respect to the driving module 1 on the left, the control module 5 can calculate the outputted second current control signal after the first current control signal is developed with a gain increase according to the above-mentioned signal gain function: L2=L1×0.58. On the other hand, similarly, when the autonomous mobile device Z with a weight of 300 kg turns left by 10 degrees on the right-inclined slope having a gradient of 10 degrees, the weight factor of the driving module 1 on the right is (300/500)=0.6. The gradient factor is (1+tan(10))=1.176 (since the motor 12 needs to output greater torque when turning left on the right-inclined slope, the gradient factor is increased), and the steering factor is (1+tan(10))=1.176 (since the motor 12 of the driving module 1 on the right needs to output greater torque when turning left, the steering factor is increased). Therefore, an overall gain of the driving module 1 on the right is 0.6×1.176×1.176=0.83. That is to say, with respect to the driving module 1 on the right, the control module 5 can calculate the outputted second current control signal after the first current control signal is developed with the gain increase according to the above-mentioned signal gain function: L2=L1×0.83.

For example, when the autonomous mobile device Z with a weight of 700 kg turns left by 10 degrees (the steering angle $\theta_2$ being 10 degrees) on a left-inclined slope having a gradient of 15 degrees (the tilt angle $\theta_1$ being 15 degrees), the weight factor of the driving module 1 on the left is (700/500)=1.4. The gradient factor is (1−tan(15))=0.732 (since the motor 12 needs to output lesser torque when turning left on the left-inclined slope, the gradient factor is decreased), and the steering factor is (1−tan(10))=0.823 (since the motor 12 of the driving module 1 on the left needs to output lesser torque when turning left, the steering factor is decreased). Therefore, the overall gain of the driving module 1 on the left is 1.4×0.732×0.823=0.84. That is to say, with respect to the driving module 1 on the left, the control module 5 can calculate the outputted second current control signal after the first current control signal is developed with the gain increase according to the above-mentioned signal gain function: L2=L1×0.84. On the other hand, similarly, when the autonomous mobile device Z with a weight of 700 kg turns left by 10 degrees (the steering angle $\theta_2$ being 10 degrees) on the left-inclined slope having a gradient of 15 degrees (the tilt angle $\theta_1$ being 15 degrees), the weight factor of the driving module 1 on the right is (700/500)=1.4. The gradient factor is (1−tan(15))=0.732 (since the motor 12 needs to output lesser torque when turning left on the left-inclined slope, the gradient factor is decreased), and the steering factor is (1+tan(10))=1.176 (since the motor 12 of the driving module 1 on the right needs to output greater torque when turning left, the gradient factor is increased). Therefore, the overall gain value of the driving module 1 on the right is 1.4×0.732×1.176=1.2. That is to say, with respect to the driving module 1 on the right, the control module 5 can calculate the outputted second current control signal after the first current control signal is developed with the gain increase according to the above-mentioned signal gain function: L2=L1×1.2.

Beneficial Effects of the Embodiment

In conclusion, in the power adjustment system and the power adjustment method of the autonomous mobile device Z provided by the present disclosure, by virtue of "the control module 5 being configured to output two first current control signals that are respectively transmitted to the two drivers 11, such that the two drivers 11 output two initial currents respectively to the two motors 12, and the two motors 12 respectively drive the two wheels 13 to move the autonomous mobile device Z, and the control module 5 being configured to estimate a weight of the autonomous mobile device Z according to information in the database module 4" and "the control module 5 being configured to output two second current control signals that are respectively transmitted to the two drivers 11 according to the two first current control signals and the weight, the steering angle $\theta_2$, and the tilt angle $\theta_1$ of the autonomous mobile device Z, and the two drivers 11 outputting two adjusting currents respectively to the two motors 12 according to the two second current control signals, such that the two motors 12 respectively drive the two wheels 13 to perform a differential control," the differential control can be performed with respect to the two driving modules 1 that operate independently from each other, so as to improve stability of the autonomous mobile device Z when making a turn, to increase work efficiency of the autonomous mobile device Z, and to decrease power consumption.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power adjustment system of an autonomous mobile device, comprising:
   two driving modules disposed in the autonomous mobile device and respectively connected to two wheels of the autonomous mobile device, wherein the two driving modules operate independently from each other, each of the driving modules includes one of two drivers and one of two motors electrically connected thereto, and each of the motors is connected to a corresponding one of the wheels;
   an inertial measurement module disposed in the autonomous mobile device and configured to detect a tilt angle of the autonomous mobile device;
   a navigation module disposed on the autonomous mobile device, wherein the navigation module is configured to plan a travel route, such that the autonomous mobile device travels along the travel route:
   a database module disposed in the autonomous mobile device and configured to store different weight values of the autonomous mobile device; and
   a control module disposed in the autonomous mobile device, wherein the control module is electrically connected to the two driving modules, the inertial measurement module, the navigation module, and the database module; wherein, when the autonomous mobile device moves along the travel route, the control module obtains a steering angle of the autonomous mobile device during a traveling process;
   wherein the control module is configured to output two first current control signals that are respectively transmitted to the two drivers, such that the two drivers output two initial currents respectively to the two motors, and the two motors respectively drive the two wheels to move the autonomous mobile device; wherein the control module is configured to estimate a weight of the autonomous mobile device according to information in the database module;
   wherein the control module is configured to output two second current control signals that are respectively transmitted to the two drivers according to the two first current control signals and the weight, the steering angle, and the tilt angle of the autonomous mobile device, and the two drivers output two adjusting currents respectively to the two motors according to the two second current control signals, such that the two motors respectively drive the two wheels to perform a differential control.

2. The power adjustment system of the autonomous mobile device according to claim 1, wherein the weight of the autonomous mobile device includes a net weight of the autonomous mobile device and a loading weight.

3. The power adjustment system of the autonomous mobile device according to claim 1, wherein the navigation module is configured to locate a position of the autonomous mobile device in real time, and construct a map of a surrounding environment at the position of the autonomous mobile device, so as to further plan the travel route.

4. The power adjustment system of the autonomous mobile device according to claim 1, wherein the control module adjusts the first current control signal according to a signal gain function, and then outputs the second current control signal; wherein the signal gain function is as follows:

$$L2=L1\times(W/W_0)\times(1\pm\tan(\theta_1))\times(1\pm\tan(\theta_2));$$

wherein L1 is the first current control signal, L2 is the second current control signal, W is the weight of the autonomous mobile device, $W_0$ is a predetermined reference weight of the autonomous mobile device, $\theta_1$ is the tilt angle, and $\theta_2$ is the steering angle.

5. The power adjustment system of the autonomous mobile device according to claim 1, wherein the database module further includes a gradient of a position of the autonomous mobile device, a current change amount outputted by the driver, and a speed of the autonomous mobile device.

6. The power adjustment system of the autonomous mobile device according to claim 5, wherein, when the current change amount outputted by each of the drivers at an nth second is greater than half of a maximum current value, the control module is configured to collect a current value at the nth second; wherein, when the current change amount outputted by each of the drivers continues for k seconds, and a variation amplitude within the k seconds is less than 10% of the current change amount at the nth second, the control module is configured to collect the speed of the autonomous mobile device at an (n+k)th second, and the control module is configured to compare the speed of the autonomous mobile device at the (n+k)th second, the current change amount outputted by the driver at the nth second, and the gradient of the position of the autonomous mobile device with the information in the database module, so as to estimate the weight of the autonomous mobile device.

7. A power adjustment method of an autonomous mobile device, wherein the autonomous mobile device is arranged to include two driving modules, an inertial measurement module, a navigation module, a database module, and a control module, the two driving modules are respectively connected to two wheels of the autonomous mobile device, each of the driving modules includes one of two drivers and one of two motors electrically connected thereto, each of the motors is connected to a corresponding one of the wheels, and the control module is electrically connected to the two driving modules, the inertial measurement module, the navigation module, and the database module, the power adjustment method comprising:

outputting two first current control signals that are respectively transmitted to the two drivers by the control module, such that the two drivers output two initial currents respectively to the two motors, and the two motors respectively drive the two wheels to move the autonomous mobile device;

detecting a tilt angle of the autonomous mobile device by the inertial measurement module;

planning a travel route by the navigation module, such that the autonomous mobile device travels along the travel route, and the control module obtains a steering angle of the autonomous mobile device during a traveling process;

estimating, according to different weight values of the autonomous mobile device stored in the database module, a weight of the autonomous mobile device by the control module; and outputting, according to the two first current control signals and the weight, the steering angle, and the tilt angle of the autonomous mobile device, two second current control signals that are respectively transmitted to the two drivers by the control module, wherein the two drivers output two adjusting currents respectively to the two motors according to the two second current control signals, such that the two motors respectively drive the two wheels to perform a differential control.

8. The power adjustment method of the autonomous mobile device according to claim 7, wherein the weight of the autonomous mobile device includes a net weight of the autonomous mobile device and a loading weight.

9. The power adjustment method of the autonomous mobile device according to claim 7, wherein the navigation module is configured to locate a position of the autonomous mobile device in real time, and construct a map of a surrounding environment at the position of the autonomous mobile device, so as to further plan the travel route.

10. The power adjustment method of the autonomous mobile device according to claim 7, wherein the control module adjusts the first current control signal according to a signal gain function, and then outputs the second current control signal; wherein the signal gain function is as follows:

$$L2 = L1 \times (W/W_0) \times (1 \pm \tan(\theta_1)) \times (1 \pm \tan(\theta_2));$$

wherein L1 is the first current control signal, L2 is the second current control signal, W is the weight of the autonomous mobile device, $W_0$ is a predetermined reference weight of the autonomous mobile device, $\theta_1$ is the tilt angle, and $\theta_2$ is the steering angle.

11. The power adjustment method of the autonomous mobile device according to claim 7, wherein the database module further includes a gradient of a position of the autonomous mobile device, a current change amount outputted by the driver, and a speed of the autonomous mobile device.

12. The power adjustment method of the autonomous mobile device according to claim 11, wherein, when the current change amount outputted by each of the drivers at an nth second is greater than half of a maximum current value, the control module is configured to collect a current value at the nth second; wherein, when the current change amount outputted by each of the drivers continues for k seconds, and a variation amplitude within the k seconds is less than 10% of the current change amount at the nth second, the control module is configured to collect the speed of the autonomous mobile device at an (n+k)th second, and the control module is configured to compare the speed of the autonomous mobile device at the (n+k)th second, the current change amount outputted by the driver at the nth second, and the gradient of the position of the autonomous mobile device with information in the database module, so as to estimate the weight of the autonomous mobile device.

\* \* \* \* \*